United States Patent
Watahiki

(10) Patent No.: US 9,971,695 B2
(45) Date of Patent: May 15, 2018

(54) APPARATUS AND METHOD FOR CONSOLIDATING MEMORY ACCESS PREDICTION INFORMATION TO PREFETCH CACHE MEMORY DATA

(71) Applicant: FUJITSU LIMITED, Kawasaki-shi, Kanagawa (JP)

(72) Inventor: Tomoyuki Watahiki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 428 days.

(21) Appl. No.: 14/848,812

(22) Filed: Sep. 9, 2015

(65) Prior Publication Data

US 2016/0098349 A1 Apr. 7, 2016

(30) Foreign Application Priority Data

Oct. 3, 2014 (JP) .................................. 2014-204877

(51) Int. Cl.
*G06F 12/08* (2016.01)
*G06F 12/0862* (2016.01)

(52) U.S. Cl.
CPC .. *G06F 12/0862* (2013.01); *G06F 2212/6024* (2013.01)

(58) Field of Classification Search
CPC ............. G06F 12/0862; G06F 12/0215; G06F 2212/6024
See application file for complete search history.

(56) References Cited

U.S. PATENT DOCUMENTS

| 5,797,013 A * | 8/1998 | Mahadevan ............ G06F 8/443 712/241 |
| 2002/0007484 A1* | 1/2002 | Tirumalai ............. G06F 8/4441 717/160 |

(Continued)

FOREIGN PATENT DOCUMENTS

| JP | 7-306790 | 11/1995 |
| JP | 2001-166989 | 6/2001 |

(Continued)

OTHER PUBLICATIONS

S. P. Vander Wiel and D. J. Lilja, "When caches aren't enough: data prefetching techniques," in Computer, vol. 30, No. 7, pp. 23-30, Jul. 1997. (Year: 1997).*

*Primary Examiner* — Ramon A. Mercado
(74) *Attorney, Agent, or Firm* — Staas & Halsey LLP

(57) ABSTRACT

An apparatus is connected to a main memory, includes a cache memory holding data and a memory storing prediction information in plural areas thereof. The prediction information is referenced to determine whether to execute prefetch, which holds data from the main memory to the cache memory, in a case where a plurality of unrolled instructions produced by unrolling a target instruction included in a loop sentence are executed individually, and corresponds to individual memory accesses executed at certain address intervals in accordance with the respective unrolled instructions. The apparatus executes memory access to the main memory, and executes the prefetch. When the plurality of unrolled instructions are executed individually, the apparatus consolidates a plurality of pieces of prediction information respectively stored in the plural areas of the memory into one based on the number-of-unrolling information, and stores the consolidated prediction information into any one of the plural areas.

5 Claims, 5 Drawing Sheets

(56) References Cited

U.S. PATENT DOCUMENTS

| | | | |
|---|---|---|---|
| 2004/0243981 A1 | 12/2004 | Luk et al. | |
| 2006/0059311 A1* | 3/2006 | Van De Waerdt | G06F 12/0862 711/137 |
| 2008/0016330 A1* | 1/2008 | El-Essawy | G06F 9/3455 712/225 |
| 2009/0089548 A1* | 4/2009 | Sung | G06F 9/30047 712/207 |
| 2012/0110269 A1* | 5/2012 | Frank | G06F 9/30047 711/137 |
| 2013/0185516 A1* | 7/2013 | Sassone | G06F 9/30043 711/137 |
| 2014/0143494 A1* | 5/2014 | Whalley | G06F 12/0862 711/122 |
| 2014/0189249 A1* | 7/2014 | Ye | G06F 12/0862 711/137 |

FOREIGN PATENT DOCUMENTS

| | | |
|---|---|---|
| JP | 2006-516168 | 6/2006 |
| JP | 2006-524375 | 10/2006 |

\* cited by examiner

APPARATUS AND METHOD FOR CONSOLIDATING MEMORY ACCESS PREDICTION INFORMATION TO PREFETCH CACHE MEMORY DATA

CROSS-REFERENCE TO RELATED APPLICATION

This application is based upon and claims the benefit of priority of the prior Japanese Patent Application No. 2014-204877, filed on Oct. 3, 2014, the entire contents of which are incorporated herein by reference.

FIELD

The embodiments discussed herein are related to apparatus and method for consolidating memory access prediction information to prefetch cache memory data.

BACKGROUND

An operation processing device, such as a central processing unit (CPU), or the like includes an operation processing unit that performs operation, and a cache memory disposed between the operation processing unit and a main memory. The operation processing unit refers to data stored in the main memory or the cache memory, and performs operation. The cache memory stores a part of data in the main memory.

The operation processing device refers to data stored in the cache memory that is disposed in the same semiconductor device as the operation processing device, and operates with the same clock so that the operation processing device is allowed to shorten a wait time when referring to the data compared with data stored in the main memory. In this regard, in numerical calculation processing that uses large-sized data, such as an array, when the locality of data (for example, the possibility of data once referenced is referenced again) is low, the hit rate of the cache memory is decreased. If a cache miss occurs, a wait time when the operation processing device refers to data increases by a time period of transferring the data from the main memory to the cache memory compared with the case of a cache hit.

For a method of reducing a decrease in the hit rate of a cache memory, prefetching data stored in the main memory into the cache memory so that requisite data is recorded in advance is used (for example, refer to Japanese Laid-open Patent Publication No. 2001-166989 and Japanese National Publication of International Patent Application No. 2006-524375). As a method of achieving prefetch, hardware prefetch using hardware and software prefetch using software are known.

In hardware prefetch, a proposal has been made of a method of achieving prefetch by using a stride prediction table that stores a stride value of memory accesses executed at predetermined address intervals (hereinafter also referred to as a stride value) (for example, refer to Japanese National Publication of International Patent Application No. 2006-516168). In the hardware prefetch of this kind, when instructions in a loop defined by a loop sentence are unrolled, a stride prediction table having the number of unrolled instructions (hereinafter also referred to as the number of unrolling) is used.

Unrolling instructions in a loop defined in a loop sentence is executed at the time of compiling, or the like in order to increase execution speed of a program compared with executing the loop sentence without unrolling the instructions in the loop. In this regard, in software prefetch, a proposal is made of a method of determining a position where a prefetch instruction is inserted in accordance with the number of unrolling (for example, refer to Japanese Laid-open Patent Publication No. 7-306790).

SUMMARY

According to an aspect of the invention, an apparatus is connected to a main memory, and includes a cache memory configured to hold data and a memory configured to store prediction information in a plurality of areas thereof. The prediction information is referenced to determine whether to execute prefetch, which holds data from the main memory to the cache memory, in a case where a plurality of unrolled instructions produced by unrolling a target instruction included in a loop sentence are executed individually, where the prediction information corresponds to individual memory accesses executed at certain address intervals in accordance with the respective unrolled instructions. The apparatus executes memory access to the main memory, and executes the prefetch. When the plurality of unrolled instructions are executed individually, the apparatus generates consolidated prediction information by consolidating a plurality of pieces of prediction information respectively stored in the plurality of areas of the prediction information storage unit into one based on the number-of-unrolling information, and stores the consolidated prediction information into any one of the plurality of areas.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
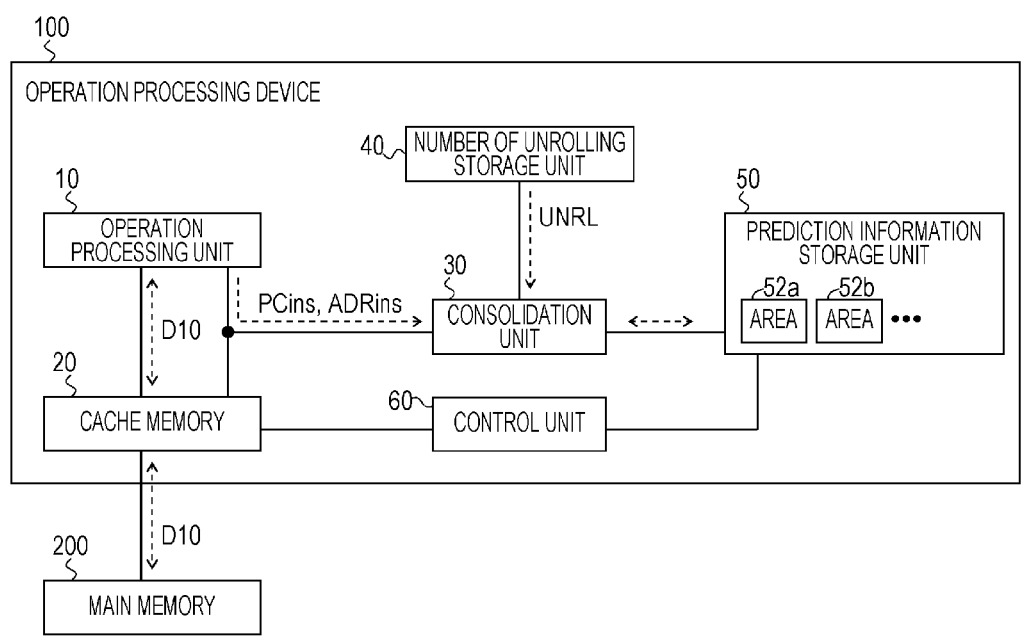
FIG. 1 is a diagram illustrating an example of an operation processing device and a method of controlling an operation processing device, according to an embodiment.

When instructions in a loop defined in a loop sentence are unrolled, and stride prediction tables for the number of unrolling are used, the number of stride prediction tables that are allowed to be used by memory accesses other than the memory accesses corresponding to the unrolled instructions in the loop decreases. Accordingly, the number of memory accesses to which hardware prefetch is not applied increases, and thus the performance of the operation processing device decreases.

In the following, descriptions will be given of embodiments by using the drawings. A dashed arrow illustrated in the drawings denotes a flow of a signal, such as data, or the like.

FIG. 1 is a diagram illustrating an operation processing device, and a method of controlling an operation processing device according to an embodiment. An operation processing device 100 according to the embodiment is a processor, such as a central processing unit (CPU), or the like that executes prefetch in which data stored in a main memory 200 is transferred to a cache memory 20, for example. The main memory 200 stores a machine language program to be executed by the operation processing device 100, data to be used for calculation by the operation processing device 100, and the calculation result, and the like. The machine language program is produced by a compiler device compiling a source program.

For achieving prefetch, hardware prefetch using hardware is used. The hardware prefetch is carried out by hardware, such as a hardware prefetch control unit, or the like built in the operation processing device 100. For example, the control unit 60 of the operation processing device 100 executes prefetch for holding data from the main memory 200 to the cache memory 20. In this regard, for achieving prefetch, both software prefetch based on software and hardware prefetch may be used.

The operation processing device 100 includes an operation processing unit 10, the cache memory 20, a consolidation unit 30, a number-of-unrolling storage unit 40, a prediction information storage unit 50, and a control unit 60. The operation processing unit 10 performs operation with reference to data stored in the main memory 200, the cache memory 20, and the like. Accordingly, the operation processing unit 10 carries out memory accesses in order to transfer data D10 to and from the main memory 200.

For example, the operation processing unit 10 outputs a program counter value PCins indicating an address of the location where a memory access instruction (a load instruction, a store instruction, or the like) that performs a memory access to be executed, to the cache memory 20 and the consolidation unit 30. Hereinafter the program counter value is also referred to as a PC value. Also, the operation processing unit 10 outputs an access address ADRins indicating a storage location of the data accessed by the memory access instruction, to the cache memory 20 and the consolidation unit 30.

The cache memory 20 includes an instruction cache for storing an instruction, and a data cache for storing data. In this regard, the instruction cache may be disposed separately from the cache memory 20 including the data cache. The cache memory 20 is disposed between the operation processing unit 10 and the main memory 200, and stores data of the main memory 200, which was referenced by the operation processing unit 10. Also, the cache memory 20 stores data transferred from the main memory 200 by prefetch.

The data access between the cache memory 20 and the operation processing unit 10 is performed at a higher speed compared with the data access between the main memory 200 and the operation processing unit 10. Accordingly, the operation processing unit 10 refers to data stored in the cache memory 20 so as to shorten a wait time when referring to the data compared with a wait time when referring to data stored in the main memory 200.

The prediction information storage unit 50 is assigned to a memory included in the operation processing device 100, for example. Each of a plurality of areas 52 (52a, 52b, . . . ) in the prediction information storage unit 50 stores prediction information to be referenced when a determination is made of whether to execute prefetch or not, and is reserved for a corresponding one of memory accesses carried out at certain address intervals. For example, when memory accesses that are carried out at address intervals of i bytes (i is a positive integer) occur, one of the plurality of areas 52 of the prediction information storage unit 50 is assigned to a corresponding one of memory accesses executed at address intervals of i bytes. That is to say, the prediction information storage unit 50 stores a plurality of pieces of prediction information corresponding to individual memory accesses executed at certain address intervals, into the plurality of areas 52, respectively.

Then when the hardware prefetch control unit, or the like built in the operation processing device 100 determines whether to execute prefetch or not, the prediction information stored in the prediction information storage unit 50 is referenced. For example, whether to execute prefetch or not is determined based on the access address ADRins accessed by a memory access instruction, and the prediction information (the address, or the like corresponding to the timing of executing prefetch) stored in the prediction information storage unit 50.

When instructions in a loop defined by a loop sentence are unrolled into a plurality of instructions, the number-of-unrolling storage unit 40 stores the number of unrolling UNRL corresponding to the number of unrolled instructions. For example, in the case where a compiler device unrolls instructions in a loop defined by a loop sentence when the compiler device compiles a source program to generate a machine language program, the machine language program including an instruction to store the number of unrolling UNRL into the number-of-unrolling storage unit 40 is generated. Then the machine language program generated by the compiler device is executed on the operation processing device 100 so that the number of unrolling UNRL is stored into the number-of-unrolling storage unit 40. In the following, "instructions in a loop defined by a loop sentence are unrolled into a plurality of instructions" is also simply referred to as "a loop is unrolled".

The consolidation unit 30 receives the access address ADRins and the program counter value PCins from the operation processing unit 10, and receives the number of unrolling UNRL from the number-of-unrolling storage unit 40. Then the consolidation unit 30 manages the state of the prediction information storage unit 50, based on the access address ADRins, the program counter value PCins, and the number of unrolling UNRL.

Also, when a loop is unrolled, and a plurality of unrolled instructions are executed, the consolidation unit 30 consolidates a plurality of pieces of prediction information corresponding to the individual memory accesses executed in accordance with the plurality of unrolled instructions, into common prediction information, based on the number of unrolling UNRL and the like. Hereinafter the common prediction information is also referred to as consolidated prediction information.

The consolidation unit 30 stores the prediction information consolidated based on the number of unrolling UNRL and the like, into any one of the plurality of areas 52 of the prediction information storage unit 50. For example, the consolidation unit 30 determines that the memory accesses to be executed after receiving the number of unrolling UNRL from the number-of-unrolling storage unit 40 are memory accesses to be individually executed in accordance with the plurality of instructions unrolled by the number of unrolling UNRL in a loop.

Then the consolidation unit 30 calculates an address interval of a series of memory accesses which are to be respectively executed in accordance with a plurality of (the number of unrolling UNRL) unrolled instructions in a loop, based on the number of unrolling UNRL, the access address ADRins, and the like. Then the consolidation unit 30 stores the calculated address interval into the area 52 where the consolidated prediction information is stored, out of the plurality of areas 52 of the prediction information storage unit 50.

The address interval stored in each area 52 of the prediction information storage unit 50 is used when the prediction information stored in each area 52 of the prediction information storage unit 50 is updated. For example, the consolidation unit 30 updates the prediction information stored in the area 52 of the prediction information storage unit 50, based on the address interval (the address interval calculated based on the number of unrolling UNRL, and the like) stored in the area 52 of the prediction information storage unit 50.

The prediction information stored in the area 52 of the prediction information storage unit 50 is updated based on the address interval of a series of memory accesses which respectively correspond to the plurality of unrolled instructions in a loop, and thus is shared with the memory accesses corresponding to the plurality of unrolled instructions. That is to say, a plurality of pieces of prediction information corresponding to memory accesses which are respectively executed in accordance with a plurality of unrolled instructions in a loop, are consolidated into consolidated prediction information.

Here, for example, a description will be given of the case where a loop (i=0, 1, 2, 3, 4, and 5) including instructions that access an array A [i] is unrolled to a loop (i=0, 3) including three instructions that access an array A [i], an array A [i+1], and an array A [i+2], respectively. An operation processing device without having the consolidation unit 30 determines that the array A [i], the array A [i+1], and the array A [i+2] are different array data (stream) with one another.

Accordingly, in the operation processing device without having the consolidation unit 30, in order to execute prefetch that handles the array A [i], the array A [i+1], and the array A [i+2], three pieces of prediction information that handles the array A [i], the array A [i+1], and the array A [i+2] are requisite. In this case, in the operation processing device without having the consolidation unit 30, the prediction information storage unit 50 includes at least three areas 52.

In this manner, in the operation processing device without having the consolidation unit 30, the same number of areas 52 as the number of unrolling (three in the example described above) of the loop are assigned to the prediction information storage unit 50. Accordingly, for example, in the case where the number of areas 52 of the prediction information storage unit 50 included in the operation processing device is one, and the number of unrolling of a loop is three, hardware prefetch is not applied to the memory accesses corresponding to two instructions out of the three unrolled instructions.

In contrast, the consolidation unit 30 consolidates the three pieces of prediction information respectively corresponding to the array A [i], the array A [i+1], and the array A [i+2], into one piece of consolidated prediction information. For example, the consolidation unit 30 calculates an address interval of a series of memory accesses including the access to the array A [i], the access to the array A [i+1], and the access to the array A [i+2]. Then the consolidation unit 30 stores the calculated address interval into the area 52 (for example, the area 52a) of the prediction information storage unit 50. Also, the consolidation unit 30 updates the prediction information stored in the area 52 of the prediction information storage unit 50, based on the address interval stored in the area 52 of the prediction information storage unit 50.

That is to say, the prediction information stored in the area 52 of the prediction information storage unit 50 is updated based on the address interval of a series of memory accesses respectively corresponding to the array A [i], the array A [i+1], and the array A [i+2]. Accordingly, the prediction information stored in the area 52 of the prediction information storage unit 50 is shared among the memory accesses corresponding to the array A [i], the array A [i+1], and the array A [i+2].

For example, in the case where the number of areas 52 of the prediction information storage unit 50 included in the operation processing device 100 is one, and the number of unrolling of a loop is three, three unrolled instructions use one pieces of consolidated prediction information. Accordingly, it is possible for the operation processing device 100 to apply hardware prefetch to the memory accesses corresponding to the three instructions. As a result, it is possible to improve the performance of the operation processing device 100.

In this regard, the configuration of the operation processing device 100 is not limited to this example. For example, the operation processing device 100 may include two prediction information storage units 50 or more. Also, for example, the number of areas 52 of the prediction information storage unit 50 may be one, or two or more.

For example, when the number of areas 52 of the prediction information storage unit 50 included in the operation processing device 100 is three, and the number of unrolling of a loop is three, one area 52 of the prediction information storage unit 50 is assigned to the three unrolled instructions. Accordingly, it is possible for the remaining two areas 52 of the prediction information storage unit 50 to be used for the other memory accesses. That is to say, it is possible to assign the two areas 52 of the prediction information storage unit 50 to the memory accesses other than the unrolled loop. Accordingly, it is possible to execute hardware prefetch in a memory access other than the unrolled loop, and thus to improve the performance of the operation processing device 100.

In the above, in the embodiment illustrated in FIG. 1, the consolidation unit 30 consolidates a plurality of pieces of (for the number of unrolling) prediction information respectively corresponding to the memory accesses executed by a plurality of unrolled instructions in a loop, into consolidated prediction information. Thereby, the operation processing device 100 is allowed to reduce the number of areas 52 of the prediction information storage unit 50, which are correspondingly assigned to a plurality of unrolled instructions in the loop, compared with the case of the operation processing device not including the consolidation unit 30. As a result, it is possible to effectively use the prediction information storage unit 50, and thus to improve the performance of the operation processing device 100.

Figure 2:
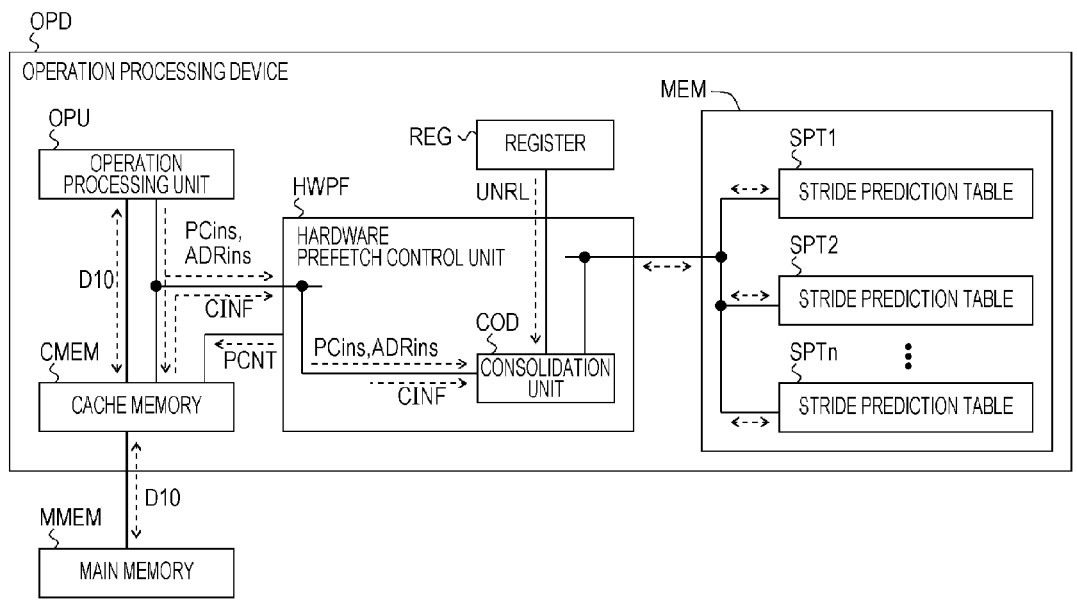
FIG. 2 is a diagram illustrating an example of an operation processing device and a method of controlling the operation processing device, according to another embodiment.

FIG. 2 is a diagram illustrating an operation processing device, and a method of controlling an operation processing device according to another embodiment. Same or similar symbols are given to same or similar elements as elements illustrated in FIG. 1, and detailed descriptions will be omitted of these. In this regard, in FIG. 2, signal lines other than the signal lines related to the consolidation unit COD are omitted among the signal lines in a hardware prefetch control unit HWPF in order to make the diagram easy to view.

An operation processing device OPD is a processor, such as a CPU, that executes prefetch in which data stored in a main memory MMEM is transferred to a cache memory CMEM. In this regard, the main memory MMEM is the same as or similar to the main memory 200 illustrated in FIG. 1.

The operation processing device OPD includes an operation processing unit OPU, the cache memory CMEM, the hardware prefetch control unit HWPF, a register REG, and a memory MEM. Also, the hardware prefetch control unit HWPF includes the consolidation unit COD. A plurality of stride prediction tables SPT (SPT1, SPT2, ... SPTn) are assigned to the memory MEM.

The operation processing unit OPU and the cache memory CMEM are the same as or similar to the operation processing unit 10 and the cache memory 20 illustrated in FIG. 1, respectively. For example, when the operation processing unit OPU executes a memory access, the operation processing unit OPU outputs a program counter value PCins and an access address ADRins, to the cache memory CMEM and the hardware prefetch control unit HWPF. The program counter value PCins is information indicating a storage location (address) of the memory access instruction (a load instruction, a store instruction, and the like), and the access address ADRins is information indicating a storage location (address) of data accessed by the memory access instruction.

Thereby, the consolidation unit COD disposed in the hardware prefetch control unit HWPF receives the program counter value PCins and the access address ADRins from the operation processing unit OPU.

Also, when a cache miss occurs, the cache memory CMEM outputs information CINF indicating the occurrence of a cache miss to the hardware prefetch control unit HWPF.

The register REG is an example of the number-of-unrolling storage unit that stores the number of unrolling. The memory MEM is an example of the prediction information storage unit that stores a plurality of pieces of prediction information in a plurality of areas, respectively. That is to say, the stride prediction table SPT is an example of an area of the prediction information storage unit that stores prediction information. The register REG, the memory MEM, and the stride prediction table SPT are the same as or similar to the number-of-unrolling storage unit 40, the prediction information storage unit 50, and the area 52 of the prediction information storage unit 50, illustrated in FIG. 1, respectively.

The hardware prefetch control unit HWPF executes prefetch, based on the stride prediction table SPT. For example, each time the hardware prefetch control unit HWPF receives an access address ADRins and the like from the operation processing unit OPU, the hardware prefetch control unit HWPF determines whether to execute prefetch based on the prediction information recorded in the stride prediction table SPT or not. Then when the hardware prefetch control unit HWPF determines to execute prefetch, the hardware prefetch control unit HWPF outputs a control signal PCNT including an address that is accessed by prefetch or the like to the cache memory CMEM to execute prefetch.

The consolidation unit COD is the same as or similar to the consolidation unit 30 illustrated in FIG. 1. For example, the consolidation unit COD receives the program counter value PCins and the access address ADRins from the operation processing unit OPU, receives the information CINF from the cache memory CMEM, and receives the number of unrolling UNRL from the register REG. Then the consolidation unit COD manages the state of the stride prediction table SPT, based on the program counter value PCins, the access address ADRins, the information CINF, and the number of unrolling UNRL.

For example, the consolidation unit COD consolidates prediction information of a plurality of (for the number of unrolling) the stride prediction tables SPT that are assigned correspondingly to memory accesses executed by unrolled instructions in a loop, into prediction information of the common stride prediction table SPT. For example, the consolidation unit COD consolidates prediction information corresponding to memory accesses respectively executed in accordance with a plurality of unrolled instructions in a loop, into the common prediction information, and records the consolidated prediction information (common prediction information) in the common stride prediction table SPT.

In this regard, the configuration of the operation processing device OPD is not limited to this example. For example, the consolidation unit COD may be disposed at the outside of the hardware prefetch control unit HWPF. Also, the stride prediction table SPT may be one.

Figure 3:
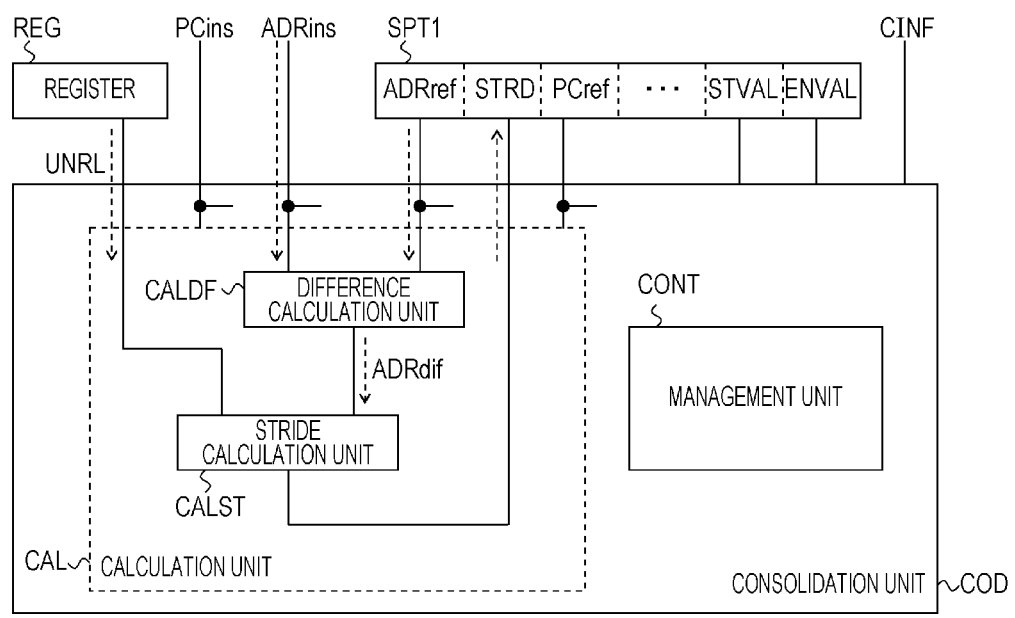
FIG. 3 is a diagram illustrating an example of a consolidation unit and a stride prediction table, according to an embodiment.

FIG. 3 is a diagram illustrating an example of the consolidation unit COD and the stride prediction table SPT illustrated in FIG. 2. In FIG. 3, signal lines other than the signal lines related to the calculation unit CAL are omitted among the signal lines in the consolidation unit COD in order to make the diagram easy to view. First, a description will be given of the stride prediction table SPT1. The configuration of the stride prediction table SPT other than the stride prediction table SPT1 is the same as or similar to that of the stride prediction table SPT1. Accordingly, in FIG. 3, descriptions of the stride prediction table SPT other than the stride prediction table SPT1 are omitted.

The stride prediction table SPT1 has areas including a reference address ADRref, a stride value STRD, a reference program counter value PCref, a flag STVAL, an ENVAL, and the like. The reference address ADRref is included in the prediction information. That is to say, the stride prediction table SPT1 stores the prediction information including the reference address ADRref. The prediction information may include only the reference address ADRref, or may include the reference address ADRref and the information (for example, the reference program counter value PCref) other than the reference address ADRref.

The reference address ADRref is an address to be compared with the access address ADRins. For example, prefetch is executed when a memory access to the same address as the reference address ADRref is executed.

The stride value STRD is a value to be used when the reference address ADRref is updated. For example, each time a memory access to the same address as the reference address ADRref is executed, the reference address ADRref is updated to the sum of the access address ADRins and the stride value STRD. The reference program counter value PCref is a value to be compared with the program counter value PCins.

The flag STVAL is a flag indicating whether the stride value STRD is valid or not. For example, when the flag STVAL is set at a logical value "1", the stride value STRD of the stride prediction table SPT1 is valid. That is to say, when the flag STVAL is set at a logical value "0", the stride value STRD of the stride prediction table SPT1 is invalid.

The flag ENVAL is an example of entry information indicating that the stride prediction table SPT1 is in a recorded state of being assigned to any one of the memory accesses. For example, when the stride prediction table SPT1 is in the recorded state of being assigned to any one of the memory accesses, the flag ENVAL is set at the logical value "1". Also, when the stride prediction table SPT1 is not the recorded state (for example, when the stride prediction table SPT1 is not corresponding to any one of the memory accesses), the flag ENVAL is set at a unrecorded state (for example, the logical value "0") indicating that the stride prediction table SPT1 is not in a recorded state.

The consolidation unit COD includes a calculation unit CAL and a management unit CONT. The calculation unit CAL calculates a stride value STRD, based on the program counter value PCins, the access address ADRins, the reference address ADRref, and the number of unrolling UNRL. A description will be given of timing of calculating the stride value STRD, with reference to FIG. 5. The calculation unit CAL includes a difference calculation unit CALDF, and a stride calculation unit CALST, for example.

The difference calculation unit CALDF receives a reference address ADRref from the stride prediction table SPT in which the reference program counter value PCref that matches the program counter value PCins is recorded, for example. Also, the difference calculation unit CALDF receives an access address ADRins from the operation processing unit OPU.

For example, when the program counter value PCins matches the reference program counter value PCref of a stride prediction table SPT1, the difference calculation unit CALDF reads the reference address ADRref from the stride prediction table SPT1. Then the difference calculation unit CALDF subtracts the reference address ADRref from the access address ADRins to calculate an address difference ADRdif.

In this regard, the reference address ADRref to be used when calculating the address difference ADRdif is a newly recorded reference address ADRref (the reference address ADRref before updated based on the stride value STRD), as will be described in FIG. 5.

The stride calculation unit CALST receives the address difference ADRdif from the difference calculation unit CALDF, and receives the number of unrolling UNRL from the register REG. Then the stride calculation unit CALST divides the address difference ADRdif by the number of unrolling UNRL to calculate a stride value STRD. The calculated stride value STRD is recorded in the stride prediction table SPT in which the reference program counter value PCref matching the program counter value PCins is recorded, for example.

For example, when the program counter value PCins matches the reference program counter value PCref of a stride prediction table SPT1, the stride calculation unit CALST records the calculated stride value STRD in the stride prediction table SPT1. When a valid number of unrolling UNRL is not stored in the register REG, the stride calculation unit CALST may record the address difference ADRdif in the stride prediction table SPT1 as a stride value STRD.

In this manner, it is possible for the calculation unit CAL to calculate an address interval (stride value STRD) of a series of memory accesses which are to be respectively executed in accordance with a plurality of (the number of unrolling UNRL) unrolled instructions in a loop. Thereby, it is possible to assign a common stride prediction table SPT to the memory accesses that are respectively executed in accordance with a plurality of (the number of unrolling UNRL) unrolled instructions in a loop. That is to say, it is possible to consolidate prediction information of a plurality of (for the number of unrolling UNRL) stride prediction tables SPT assigned correspondingly to a plurality of (the number of unrolling UNRL) unrolled instructions in a loop, into prediction information of the common stride prediction table SPT. As a result, it is possible to use the stride prediction table SPT effectively.

The management unit CONT resets the flag ENVAL to an unrecorded state, based on the program counter value PCins, the access address ADRins, the reference program counter value PCref, and the reference address ADRref. For example, the management unit CONT resets the flag ENVAL of the stride prediction tables SPT other than the common stride prediction table SPT among a plurality of stride prediction tables SPT correspondingly assigned to a plurality of unrolled instructions in a loop, to an unrecorded state. A description will be given of the configuration of the management unit CONT with reference to FIG. 4. In this regard, the configuration of the consolidation unit COD is not limited to this example.

Figure 4:
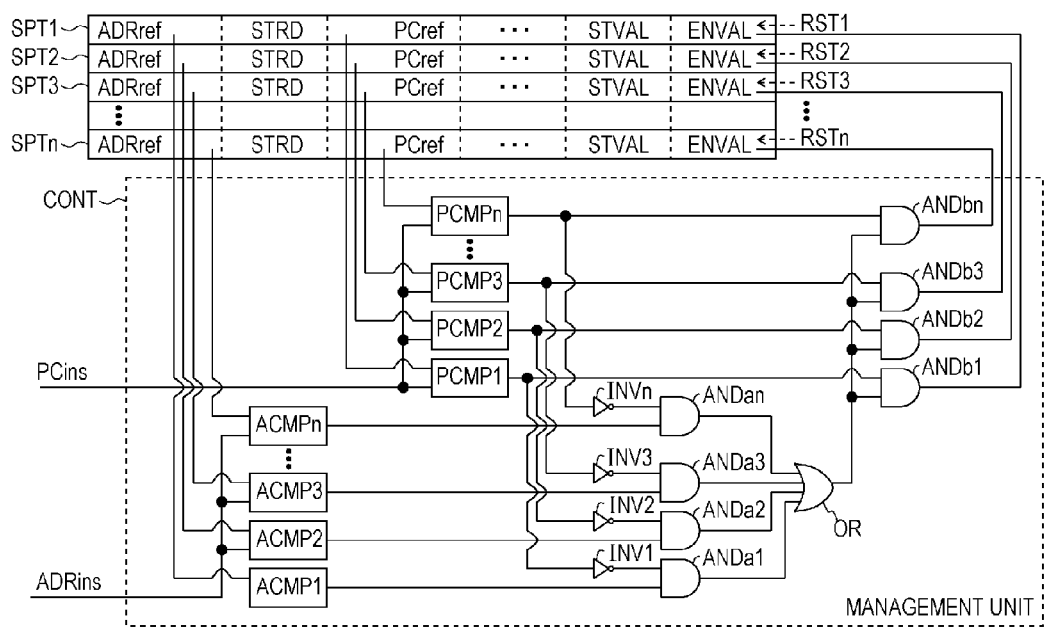
FIG. 4 is a diagram illustrating an example of a management unit, according to an embodiment.

FIG. 4 is a diagram illustrating an example of the management unit CONT illustrated in FIG. 3. The management unit CONT includes a plurality of comparison units ACMP, a plurality of comparison units PCMP, a plurality of inverters INV, a plurality of AND circuits ANDa, a plurality of AND circuits ANDb, and OR circuits OR. A last number and "n" of the symbols of the comparison unit ACMP, the PCMP, the inverter INV, and the AND circuits ANDa and ANDb correspond to a last number and "n" of the symbols of the stride prediction table SPT.

The comparison units ACMP1, ACMP2, ACMP3, . . . , and ACMPn compare the access address ADRins, and the reference address ADRref of the stride prediction tables SPT1, SPT2, SPT3, . . . , and SPTn. Then the comparison units ACMP1, ACMP2, ACMP3, . . . , and ACMPn output the comparison results to the AND circuits ANDa1, ANDa2, ANDa3, . . . , and ANDan, respectively.

For example, the comparison unit ACMP1 receives the access address ADRins, and the reference address ADRref of the stride prediction table SPT1, and compares the access address ADRins with the reference address ADRref of the stride prediction table SPT1. Then when the access address ADRins matches the reference address ADRref of the stride prediction table SPT1, the comparison unit ACMP1 outputs a signal having a logical value "1" to the AND circuit ANDa1, for example. Also, when the reference address ADRref does not match the access address ADRins of the stride prediction table SPT1, the comparison unit ACMP1 outputs a signal having a logical value "0" to the AND circuit ANDa1.

The comparison units PCMP1, PCMP2, PCMP3, . . . , and PCMPn individually compare the program counter value PCins with the reference program counter value PCref of the stride prediction table SPT1, SPT2, SPT3, . . . , and SPTn. Then the comparison units PCMP1, PCMP2, PCMP3, . . . , and PCMPn output the comparison results to AND circuits ANDb1, ANDb2, ANDb3, . . . , and ANDbn, respectively. Further, the comparison units PCMP1, PCMP2, PCMP3, . . . , and PCMPn output the comparison results to inverters INV1, INV2, INV3, . . . , and INVn, respectively.

For example, the comparison unit PCMP1 receives the program counter value PCins, and the reference program counter value PCref of the stride prediction table SPT1. Then the comparison unit PCMP1 compares the program counter value PCins and the reference program counter value PCref of the stride prediction table SPT1, and outputs the comparison result to the AND circuit ANDb1 and the inverter INV1.

For example, when the program counter value PCins matches the reference program counter value PCref of the stride prediction table SPT1, the comparison unit PCMP1 outputs a signal having a logical value "1" to the AND circuit ANDb1 and the inverter INV1. Also, when the program counter value PCins does not match the reference program counter value PCref of the stride prediction table SPT1, the comparison unit PCMP1 outputs a signal having a logical value "0" to the AND circuit ANDb1, and the inverter INV1.

The inverters INV1, INV2, INV3, . . . , and INVn outputs inverted signals of the output signals of the comparison units PCMP1, PCMP2, PCMP3, . . . , and PCMPn to the AND circuits ANDa1, ANDa2, ANDa3, . . . , and ANDan, respectively. For example, the inverter INV1 outputs the inverted signal of the output signal (the comparison result of the program counter value PCins and the reference program counter value PCref of the stride prediction table SPT1) of the comparison unit PCMP1 to the AND circuit ANDa1.

The AND circuits ANDa1, ANDa2, ANDa3, . . . , and ANDan perform AND operation of the output signals of the comparison units ACMP1, ACMP2, ACMP3, . . . , and ACMPn, and the output signals of the inverters INV1, INV2, INV3, . . . , and INVn, respectively. Then the AND circuits ANDa1, ANDa2, ANDa3, . . . , and ANDan output the AND operation result to an OR circuit OR. For example, the AND circuit ANDa1 outputs the AND operation result of the output signal of the comparison unit ACMP1 and the output signal of the inverter INV1, to the OR circuit OR.

The OR circuit OR outputs the OR operation results of the output signals of the AND circuits ANDa1, ANDa2, ANDa3, . . . , and ANDan, to the AND circuits ANDb1, ANDb2, ANDb3, . . . , and ANDbn. That is to say, when any one of the output signals of the AND circuits ANDa1, ANDa2, ANDa3, . . . , and ANDan is a logical value "1", the OR circuit OR outputs a signal having the logical value "1" to the AND circuits ANDb1, ANDb2, ANDb3, . . . , and ANDbn.

The AND circuits ANDb1, ANDb2, ANDb3, . . . , and ANDbn obtain AND operation result of the output signal of the OR circuit OR and the output signals of the comparison units PCMP1, PCMP2, PCMP3, . . . , and PCMPn, respectively. Then the AND circuits ANDb1, ANDb2, ANDb3, . . . , and ANDbn output the AND operation results (reset signals RST1, RST2, RST3, . . . , and RSTn) to the stride prediction tables SPT1, SPT2, SPT3, . . . , and SPTn, respectively.

For example, the AND circuit ANDb1 outputs the AND operation result of the output signal of the OR circuit OR and the output signal of the comparison unit PCMP1, to the stride prediction table SPT1 as the reset signal RST1, where the reset signals RST1, RST2, RST3, . . . , and RSTn are signals for resetting the flags ENVAL of the stride prediction tables SPT1, SPT2, SPT3, . . . , and SPTn to an unrecorded state, respectively. For example, in the stride prediction table SPT that has received the reset signal RST having a logical value "1", the flag ENVAL is reset to the unrecorded state. On the other hand, in the stride prediction table SPT that has received the reset signal RST having a logical value "0", the flag ENVAL is maintained in a state in which the reset signal RST has been received.

In this manner, the comparison unit ACMP detects a first stride prediction table SPT in which the reference address ADRref matching the access address ADRins is recorded from a plurality of stride prediction tables SPT. In the following, the stride prediction table SPT (the first stride prediction table SPT) in which the reference address ADRref matching the access address ADRins is recorded is also referred to a stride prediction table SPT having a matched address.

Also, the comparison unit PCMP detects a second stride prediction table SPT in which the reference program counter value PCref matching the program counter value PCins is recorded from a plurality of stride prediction tables SPT. In the following, the stride prediction table SPT (the second stride prediction table SPT) in which the reference program counter value PCref matching the program counter value PCins is recorded is also referred to a stride prediction table SPT having a matched PC value.

The inverter INV, the AND circuit ANDa, and the OR circuit OR determine whether the first stride prediction table SPT detected by the comparison unit ACMP, and the second stride prediction table SPT detected by the comparison unit PCMP are different from each other or not. When it is determined that the first stride prediction table SPT and the second stride prediction table SPT are different, the AND circuit ANDb sets the flag ENVAL of the second stride prediction table SPT to an unrecorded state. In this case, the management unit CONT manages the first stride prediction table SPT as the common stride prediction table SPT.

Thereby, it is possible to reset the flags ENVAL of the stride prediction tables SPT other than the common stride prediction table SPT to an unrecorded state among a plurality of stride prediction tables SPT assigned correspondingly to a plurality of unrolled instructions in a loop. As a result, it is possible to efficiently use the stride prediction tables SPT. In this regard, the configuration of the management unit CONT is not limited to this example.

Figure 5:
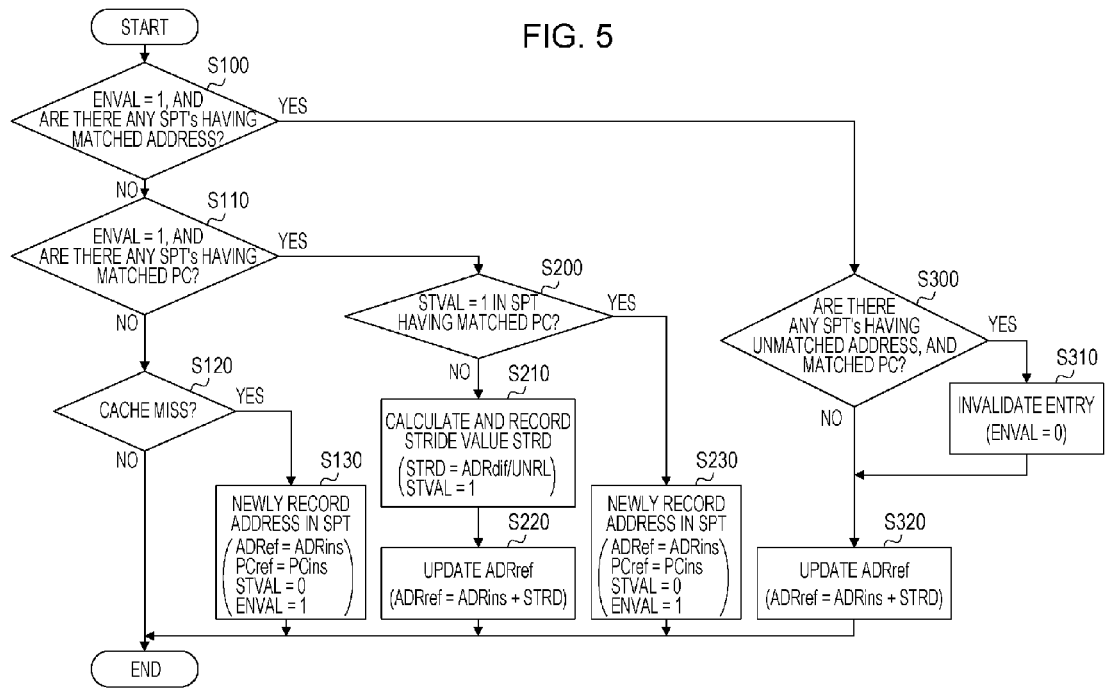
FIG. 5 is a diagram illustrating an example of an operational flowchart for an operation processing device, according to an embodiment.

FIG. 5 is a diagram illustrating an example of operation of the operation processing device OPD illustrated in FIG. 2. The operation illustrated in FIG. 5 is an example of operation of the consolidation unit COD disposed in the operation processing device OPD. For example, the operation illustrated in FIG. 5 is executed by the consolidation unit COD each time a memory access is executed. Also, when a loop is unrolled, the number of unrolling UNRL is recorded in the register REG, for example, before the processing in step S100 is executed.

For example, in the case where a compiler device compiles a source program to generate a machine language program, when instructions in a loop defined by a loop sentence is unrolled, the machine language program including an instruction to store the number of unrolling UNRL into the register REG is generated. Then the machine language program generated by the compiler device is executed by the operation processing device OPD so that the number of unrolling UNRL is stored in the register REG.

In FIG. 5, a flag ENVAL having a logical value "1" indicates a recorded state, and a flag ENVAL having a logical value "0" indicates an unrecorded state. Also, a flag STVAL having a logical value "1" indicates that the stride value STRD is valid, and a flag STVAL having a logical value "0" indicates that the stride value STRD is invalid. In the following, a stride prediction table SPT in which the flag ENVAL is set to the logical value "1" is also referred to as a stride prediction table SPT in a recorded state. Also, a stride prediction table SPT in which the flag ENVAL is set to the logical value "0" is also referred to as a stride prediction table SPT in an unrecorded state.

In step S100, the consolidation unit COD determines whether there are stride prediction tables SPT having a matched address in the stride prediction tables SPT having the recorded state. For example, the management unit CONT of the consolidation unit COD determines whether there are stride prediction tables SPT in which a reference address ADRref matching an access address ADRins is recorded in the stride prediction tables SPT having the recorded state.

When there is a stride prediction table SPT in which the reference address ADRref matching the access address ADRins is recorded (Yes in step S100), the operation of the consolidation unit COD proceeds to step S300. That is to say, when an address accessed by a memory access instruction is recorded in any one of the stride prediction tables SPT having a recorded state, the consolidation unit COD executes the processing in step S300.

On the other hand, when there are no stride prediction tables SPT in which the reference address ADRref matching the access address ADRins is recorded (No in step S100), the operation of the consolidation unit COD proceeds to step S110. In other words, when an address accessed by a memory access instruction is not recorded in any one of the stride prediction tables SPT having a recorded state, the consolidation unit COD executes the processing in step S110.

In step S110, the consolidation unit COD determines whether there are stride prediction tables SPT having the matched PC value among the stride prediction tables SPT having the recorded states. The consolidation unit COD determines whether there are stride prediction tables SPT in which the reference program counter value PCref matching the program counter value PCins is recorded among the stride prediction tables SPT having the recorded state.

When there is a stride prediction table SPT in which the reference program counter value PCref matching the program counter value PCins is recorded (Yes in step S110), the operation of the consolidation unit COD proceeds to step S200. In other words, when the program counter value PCins of the memory access instruction having an access address ADRins that is not recorded in the stride prediction table SPT is recorded in any one of the stride prediction tables SPT in a recorded state, the processing in step S200 is executed.

On the other hand, when there are no stride prediction tables SPT in which the reference program counter value PCref matching the program counter value PCins is recorded (No in step S110), the operation of the consolidation unit COD proceeds to step S120. That is, when the program counter value PCins of the memory access instruction having the access address ADRins not recorded in the stride prediction table SPT is not recorded in any one of the stride prediction tables SPT in a recorded state, the processing in step S120 is executed.

In step S120, the consolidation unit COD determines whether a memory access executed by a memory access instruction has resulted in a cache miss or not. When a cache miss has not occurred (No in step S120), the operation of the consolidation unit COD is terminated. On the other hand, when a cache miss has occurred (Yes in step S120), the operation of the consolidation unit COD proceeds to step S130.

In step S130, the consolidation unit COD newly records an access address ADRins to any one of stride prediction tables SPT. For example, the consolidation unit COD newly records the access address ADRins in a stride prediction table SPT in an unrecorded state. In the stride prediction table SPT in which an access address ADRins is newly recorded, the reference address ADRref is set at the access address ADRins, and the reference program counter value PCref is set at the program counter value PCins. Then the flag STVAL is set at the logical value "0", which indicates that the stride value STRD is invalid, and the flag ENVAL is set at the logical value "1", which indicates the recorded state.

In step S200, the consolidation unit COD determines whether the flag STVAL of the stride prediction table SPT (the stride prediction table SPT detected in step S110) having the matched PC value is the logical value "1" or not. That is, the consolidation unit COD determines whether the stride value STRD of the stride prediction table SPT having the matched PC value is valid or not. When the flag STVAL is the logical value "1" (Yes in step S200), the operation of the consolidation unit COD proceeds to step S230. In other words, when a valid stride value STRD is recorded in the stride prediction table SPT having the matched PC value, the operation of the consolidation unit COD proceeds to step S230.

On the other hand, when the flag STVAL is the logical value "0" (No in step S200), the operation of the consolidation unit COD proceeds to step S210. In other words, when the stride value STRD of the stride prediction table SPT having the matched PC value is invalid, the operation of the consolidation unit COD proceeds to step S210.

In step S210, the calculation unit CAL of the consolidation unit COD calculates a stride value STRD of the stride prediction table SPT having the matched PC value. Then the calculation unit CAL records the calculated stride value STRD in the stride prediction table SPT having the matched PC value.

For example, the difference calculation unit CALDF of the calculation unit CAL receives an access address ADRins from the operation processing unit OPU, and reads the reference address ADRref of the stride prediction table SPT having the matched PC value. Then the difference calculation unit CALDF calculates the address difference ADRdif by subtracting the reference address ADRref from the access address ADRins.

The stride calculation unit CALST of the calculation unit CAL receives the address difference ADRdif from the difference calculation unit CALDF, and reads the number of unrolling UNRL from the register REG. Then the stride calculation unit CALST divides the address difference ADRdif by the number of unrolling UNRL to calculate the stride value STRD, and records the calculated stride value STRD in the stride prediction table SPT having the matched PC value.

Thereby, a valid stride value STRD is recorded in the stride prediction table SPT having the matched PC value. Also, the consolidation unit COD sets the flag STVAL of the stride prediction table SPT having the matched PC value, at the logical value "1", which indicates that the stride value STRD is valid. In this regard, when a valid number of unrolling UNRL is not stored in the register REG, the stride calculation unit CALST may determine the address difference ADRdif to be a stride value STRD, and may record the stride value STRD in the stride prediction table SPT having the matched PC value.

In step S220, the consolidation unit COD updates the reference address ADRref of the stride prediction table SPT having the matched PC value. For example, the consolidation unit COD updates the reference address ADRref of the stride prediction table SPT having the matched PC value to the sum of the access address ADRins and the stride value STRD.

In this manner, for example, in memory access instructions having the same program counter value PCins with each other, the processing in step S130 is executed by the first time memory access, and the processing in steps S210 and S220 by the second time memory access.

In step S230, the consolidation unit COD newly records the reference address ADRref in the stride prediction table SPT having a matched PC value. Thereby, in the stride prediction table SPT having a matched PC value, the reference address ADRref is set at the access address ADRins, and the flag STVAL is set at a logical value "0", which indicates that the stride value STRD is invalid. The reference program counter value PCref is maintained to the program counter value PCins, and the flag ENVAL is maintained to the logical value "1" indicating the recorded state.

In step S300, the management unit CONT of the consolidation unit COD determines whether there are stride prediction tables SPT having a matched PC value among the stride prediction tables SPT other than the stride prediction table SPT having the matched address. This allows detecting a stride prediction table SPT in which a reference address ADRref that does not match the access address ADRins is recorded and the reference program counter value PCref matching the program counter value PCins is recorded.

Among the stride prediction tables SPT having a matched PC value, the stride prediction table SPT in which a reference address ADRref not matching the access address ADRins is recorded corresponds to a releasable stride prediction table SPT. In the following, among the stride prediction tables SPT having a matched PC value, a stride prediction table SPT in which a reference address ADRref not matching the access address ADRins is recorded is also referred to as a releasable stride prediction table SPT.

When there is a stride prediction tables SPT having a matched PC value among the stride prediction tables SPT other than the stride prediction table SPT having the matched address (Yes in step S300), the operation of the consolidation unit COD proceeds to step S310. In other words, when a releasable stride prediction table SPT is detected, the operation of consolidation unit COD proceeds to step S310.

On the other hand, when there are no stride prediction tables SPT having a matched PC value among the stride prediction tables SPT other than the stride prediction table SPT having the matched address (No in step S300), the operation of the consolidation unit COD proceeds to step S320. In other words, when a releasable stride prediction table SPT is not detected, the operation of the consolidation unit COD proceeds to step S320.

In step S310, the management unit CONT sets the flag ENVAL of the releasable stride prediction table SPT at the logical value "0" indicating the unrecorded state. Thereby, a stride prediction table SPT in which the reference address ADRref not matching the access address ADRins is recorded is set to a state allowed to be assigned to any memory access among the stride prediction tables SPT having the matched PC value.

The management unit CONT executes the processing in step S310 each time a releasable stride prediction table SPT is detected in a series of determination in steps S100 and S300. Thereby, it is possible to consolidate prediction information of a plurality of (for the number of unrolling UNRL) stride prediction tables SPT assigned correspondingly to memory accesses executed by a plurality of unrolled instructions in a loop, into prediction information of the common stride prediction table SPT.

In step S320, the consolidation unit COD updates the reference address ADRref of the stride prediction table SPT (the stride prediction table SPT detected in step S100) having the matched address. For example, the consolidation unit COD updates the reference address ADRref of the stride prediction table SPT having the matched address to the sum value of the access address ADRins and the stride value STRD. In this regard, the consolidation unit COD may update the reference address ADRref of the stride prediction table SPT having the matched address to the sum of the present-time reference address ADRref and the stride value STRD.

Also, in step S320, the hardware prefetch control unit HWPF executes prefetch on the sum address of the reference address ADRref before the update and the prefetch distance (=m times the stride value STRD where m is a positive integer). In this regard, prefetch is not executed in steps S130, S220, and S230. Also, the operation of the operation processing device OPD is not limited to this example.

As described above, it is possible to obtain the same advantages in the embodiments illustrated in FIG. 2 to FIG. 5 as those of the embodiment illustrated in FIG. 1. For example, the consolidation unit COD consolidates the prediction information of a plurality of (for the number of unrolling UNRL) stride prediction tables SPT assigned correspondingly to the memory accesses executed by a plurality of unrolled instructions in a loop, into the prediction information of the common stride prediction table SPT. Thereby, it is possible for the operation processing device OPD to reduce the number of stride prediction tables SPT to be assigned correspondingly to a plurality of unrolled instructions in a loop compared with that of the operation processing device without having the consolidation unit 30. As a result, it is possible to effectively use the stride prediction table SPT, and to improve the performance of the operation processing device OPD.

By the above detailed description, the features and the advantages of the embodiments will become apparent. It is, therefore, intended that the appended claims cover the features and the advantages of the embodiments without departing from the spirit and scope of the disclosure. Also, it will be easily understood by those skilled in the art that all modifications and changes may be made. Accordingly, it is not intended that the scope of the inventive embodiments is limited to those described above, and thus it is possible to make suitable modifications and equivalents included in the disclosed range of the embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. An operation processing device connected to a main memory, comprising:
a cache memory configured to hold data;
an operation processing unit configured to execute memory access to the main memory;

a control unit configured to execute prefetch, the prefetch holding data from the main memory to the cache memory;

a prediction information storage unit configured to store prediction information in a plurality of areas thereof, the prediction information being referenced by the control unit to determine whether to execute the prefetch in a case where a plurality of unrolled instructions produced by unrolling a target instruction included in a loop sentence are executed individually, the prediction information corresponding to individual memory accesses executed at certain address intervals in accordance with the respective unrolled instructions;

a number-of-unrolling storage unit configured to store a number-of-unrolling information corresponding to a number of unrolled instructions when the target instruction is unrolled into the plurality of unrolled instructions; and a consolidation unit configured to, when the plurality of unrolled instructions are executed individually, generate consolidated prediction information by consolidating a plurality of pieces of prediction information respectively stored in the plurality of areas of the prediction information storage unit into one based on the number-of-unrolling information, and store the consolidated prediction information into any one of the plurality of areas.

2. The operation processing device of claim 1, wherein the plurality of areas of the prediction information storage unit further stores a stride value to be used when the prediction information is updated; and the consolidation unit further includes a calculation unit configured:
  to calculate the stride value to be used when the prediction information is updated, based on an address interval of memory access repeatedly executed in accordance with any one of the plurality of unrolled instructions, and the number-of-unrolling information, and
  to store the calculated stride value into an area storing the consolidated prediction information out of the plurality of areas.

3. The operation processing device of claim 2, wherein when the operation processing unit executes memory access, the operation processing unit outputs a program counter value indicating a storage destination of a memory access instruction executing memory access, and an access address indicating a storage destination of data accessed by the memory access instruction, to the consolidation unit;

the prediction information respectively stored in the plurality of areas includes a reference address to be compared with the access address;

each of the plurality of areas further stores a reference program counter value to be compared with the program counter value, and entry information indicating whether or not each area is in a recorded state assigned correspondingly to any one of memory accesses; and the consolidation unit includes a management unit configured to, when the consolidation unit detects, from the plurality of areas, a first area storing the reference address matching the access address and a second area storing the reference program counter value matching the program counter value and different from the first area, set the entry information stored in the second area to an unrecorded state indicating that the second area is not in the recorded state.

4. A method of controlling an operation processing device including a cache memory configured to hold data, a control unit configured to execute prefetch that holds data from a main memory to the cache memory, a prediction information storage unit configured to store prediction information into a plurality of areas thereof, the prediction information being referenced by the control unit to determine whether to execute the prefetch in a case where a plurality of unrolled instructions produced by unrolling a target instruction included in a loop sentence are executed individually, the prediction information corresponding to individual memory accesses executed at certain address intervals in accordance with the respective unrolled instructions, and a number-of-unrolling storage unit configured to store a number-of-unrolling information corresponding to a number of unrolled instructions when the target instruction is unrolled into the plurality of unrolled instructions, the method comprising:
  causing an operation processing unit included in the operation processing device to execute memory access to the main memory; and
  causing a consolidation unit included in the operation processing device to, when the plurality of unrolled instructions are executed individually, generate consolidated prediction information by consolidating a plurality of pieces of prediction information respectively stored in the plurality of areas of the prediction information storage unit into one based on the number-of-unrolling information, and store the consolidated prediction information into any one of the plurality of areas.

5. An apparatus connected to a main memory, the apparatus comprising:
  a cache memory configured to hold data;
  a memory configured to store prediction information in a plurality of areas thereof, and store a number-of-unrolling information corresponding to a number of unrolled instructions when the target instruction is unrolled into the plurality of unrolled instructions, the prediction information being referenced to determine whether to execute prefetch, which holds data from the main memory to the cache memory, in a case where a plurality of unrolled instructions produced by unrolling a target instruction included in a loop sentence are executed individually, the prediction information corresponding to individual memory accesses executed at certain address intervals in accordance with the respective unrolled instructions; and
  a processor configured:
    to execute memory access to the main memory,
    to execute the prefetch, and
    to, when the plurality of unrolled instructions are executed individually, generate consolidated prediction information by consolidating a plurality of pieces of prediction information respectively stored in the plurality of areas of the memory into one based on the number-of-unrolling information, and store the consolidated prediction information into any one of the plurality of areas.

\* \* \* \* \*